(12) United States Patent
Badros

(10) Patent No.: US 8,280,946 B1
(45) Date of Patent: Oct. 2, 2012

(54) REDUCTION OF PERCEIVED DNS LOOKUP LATENCY

(75) Inventor: Greg Badros, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1954 days.

(21) Appl. No.: 10/658,390

(22) Filed: Sep. 10, 2003

(51) Int. Cl.
*G06F 15/16* (2006.01)

(52) U.S. Cl. ........................ 709/203; 709/224

(58) Field of Classification Search ................. 709/203, 709/224, 217
See application file for complete search history.

(56) References Cited

U.S. PATENT DOCUMENTS

| | | |
|---|---|---|
| 5,724,521 A | 3/1998 | Dedrick |
| 5,740,549 A | 4/1998 | Reilly et al. |
| 5,848,397 A | 12/1998 | Marsh et al. |
| 5,948,061 A | 9/1999 | Merriman et al. |
| 6,026,368 A | 2/2000 | Brown et al. |
| 6,044,376 A | 3/2000 | Kurtzman, II |
| 6,078,914 A | 6/2000 | Redfern |
| 6,144,944 A | 11/2000 | Kurtzman, II et al. |
| 6,167,382 A | 12/2000 | Sparks et al. |
| 6,269,361 B1 | 7/2001 | Davis et al. |
| 6,332,158 B1 * | 12/2001 | Risley et al. ................. 709/219 |
| 6,401,075 B1 | 6/2002 | Mason et al. |
| 6,985,882 B1 | 1/2006 | Del Sesto |
| 7,039,599 B2 | 5/2006 | Merriman et al. |
| 7,136,875 B2 | 11/2006 | Anderson et al. |
| 7,152,118 B2 * | 12/2006 | Anderson et al. ............. 709/245 |
| 7,337,910 B2 * | 3/2008 | Cartmell et al. ............. 209/245 |
| 7,664,831 B2 * | 2/2010 | Cartmell et al. ............. 709/219 |
| 2004/0205493 A1 * | 10/2004 | Simpson et al. ........... 715/501.1 |

OTHER PUBLICATIONS

Edith Cohen et al.: "Prefetching the Means for Document Transfer: A New Approach for Reducing Web Latency," 17 pages.
Brian D. Davison: "Assertion: Prefetching With GET is Not Good," 9 pages.
Amy S. Hughes et al.: "Expanding the Scope of Prefetching through Inter-Application Cooperation," 2 pages.
U.S. Appl. No. 95/001,073, Reexamination of Stone et al.
U.S. Appl. No. 95/001,061, Reexamination of Stone et al.
U.S. Appl. No. 95/001,069, Reexamination of Dean et al.
U.S. Appl. No. 95/001,068, Reexamination of Stone et al.
AdForce, Inc., A Complete Guide to AdForce, Version 2.6, 1998.
AdForce, Inc., S-1/A SEC Filing, May 6, 1999.
AdKnowledge Campaign Manager: Reviewer's Guide, AdKnowledge, Aug. 1998.
AdKnowledge Market Match Planner: Reviewer's Guide, AdKnowledge, May 1998.
Ad-Star.com website archive from www. Archive.org, Apr. 12, 1997 and Feb 1, 1997.
Baseview Products, Inc., AdManagerPro Administration Manual v. 2.0, Dec. 1998.

(Continued)

*Primary Examiner* — Ario Etienne
*Assistant Examiner* — El Hadji Sall
(74) *Attorney, Agent, or Firm* — Harrity & Harrity, LLP

(57) ABSTRACT

Perceived domain name service (DNS) lookup latency can be reduced for the user of a browser program. A server determines domain names that the user is likely to request in the future. In one implementation, a list of these domain names is transmitted to the browser program as a separate command. The browser program may then lookup up the domain names in the background before the user selects a link corresponding to the domain names. In another implementation, the domain names are transmitted to the browser program by embedding the domain names in a web document, in which the embedded information is not visible in the rendered version of the web document.

18 Claims, 7 Drawing Sheets

OTHER PUBLICATIONS

Baseview Products, Inc., ClassManagerPro Administration Manual v. 1.0.5, Feb. 1, 1997.
Business Wire, "Global Network, Inc. Enters Into Agreement in Principle With Major Advertising Agency," Oct. 4, 1999.
Information Access Technologies, Inc., Aaddzz brochure, "The Best Way to Buy and Sell Web Advertising Space," © 1997.
Information Access Technologies, Inc., Aaddzz.com website archive from www. Archive.org, archived on Jan. 30, 1998.
Zeff, R. et al., *Advertising on the Internet*, 2$^{nd}$ Ed., John Wiley & Sons, 1999.
Dedrick, R., Interactive Electronic Advertising, IEEE, 1994.
Dedrick, R., A Consumption Model for Targeted Electronic Advertising, Intel Architecture Labs, IEEE, 1995.
Request for Reexamination of U.S. Patent No. 7,240,025 B2, Control No. 95/001,073.
Request for Reexamination of U.S. Patent No. 6,446,045 B1, Control No. 95/001,061.
Request for Reexamination of U.S. Patent No. 7,249,059 B2, Control No. 95/001,069.
Request for Reexamination of U.S. Patent No. 6,829,587 B2, Control No. 95/001,068.
Statement Regarding References in 1449 Form.
Co-pending U.S. Appl. No. 13/174,569, filed Jun. 30, 2011 entitled "Reduction of Perceived DNS Lookup Latency" by Greg Badros, 35 pages.
Co-pending U.S. Appl. No. 13/230,124, filed Sep. 12, 2011 entitled "Reduction of Perceived DNS Lookup Latency" by Greg Badros, 35 pages.
Co-pending U.S. Appl. No. 13/244,859, filed Sep. 26, 2011 entitled "Reduction of Perceived DNS Lookup Latency" by Greg Badros, 34 pages.

* cited by examiner

REDUCTION OF PERCEIVED DNS LOOKUP LATENCY

BACKGROUND OF THE INVENTION

A. Field of the Invention

The present invention relates generally to web browsing and, more particularly, to techniques for reducing latency experienced by a user when browsing the world wide web.

B. Description of Related Art

The World Wide Web ("web") contains a vast amount of information. Information on the web is often presented in the form of web pages formatted as Hypertext Markup Language (HTML) documents. HTML documents may include markup symbols or codes that describe how a web browser should handle rendering of the HTML document. The markup symbols may, for example, indicate the font or style with which a particular section of text is to be displayed, the size and location of an image that is to be displayed, and the location on the web of a link to another web page.

A given web page may include references ("links") to other web pages or images. The links may refer to information stored at physically distant computing devices that are referred to by a logical address called a domain name. A domain name (also called a host name when associated with a web host) is an alpha-numeric name that is used to locate an organization or other entity on the Internet. A domain name is a meaningful and easy-to-remember "handle" for an Internet address. For example, the domain name "www.google.com" locates an Internet address for "google.com" at Internet Protocol (IP) address 216.239.53.99. An IP address is a number, such as a 32-bit number, that identifies each sender or receiver of information sent across the Internet. Before any communication can be performed with a domain name, the IP address associated with the domain name must be determined.

The domain name system (DNS) defines how Internet domain names are located and translated into IP addresses. Because maintaining a central list of domain name/IP address correspondences would be impractical, under DNS, the lists of domain names and IP addresses are distributed throughout the Internet in a hierarchy of authority.

Accordingly, before a web page stored at a specified domain name can be accessed, the accessing device must first perform (or have previously performed) a DNS lookup operation to find the IP address corresponding to the domain name. DNS lookups can account for significant perceived latency when browsing the Internet. To enhance the Internet browsing experience, it is thus desirable to reduce latency caused by DNS lookups as much as possible.

SUMMARY OF THE INVENTION

One aspect of the invention is directed to a method for reducing perceived domain name system (DNS) lookup latency. The method includes obtaining a set of documents related to a search query, ranking the set of documents based on relevance to the search query; and transmitting a list of domain names associated with a number of highly ranked documents from the set of documents to a client. The client is configured to perform DNS lookups for the list of domain names. The method further includes transmitting a web page including references to the ranked set of documents to the client.

Another method consistent with aspects of the invention decreases perceived latency by a user of a browser program. The method includes obtaining a document requested by the browser program, analyzing the document to generate a list of domain names associated with links that a user of the browser program is likely to select, and transmitting the list to the browser program. The browser program is configured to perform domain name system lookups for the domain names in the list. The method further includes transmitting the document to the browser program.

Yet another method consistent with aspects of the invention is a method for decreasing perceived latency by a user of a browser program. The method includes obtaining a document requested by the browser program, analyzing the document to generate a list of domain names associated with links that a user of the browser program is likely to select, and embedding the list of domain names in the document in a manner that causes the browser program to perform domain name system lookups for the domain names in the list. The method further includes transmitting the document, containing the embedded list of domain names, to the browser program.

Yet another method consistent with aspects of the invention includes transmitting a search query to a search engine and receiving a first response to the search query from the search engine, the first response including a plurality of domain names associated with documents that the search engine determines that a user of the browser program is likely to select in the future. The method further includes pre-resolving the domain names in the first response.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The detailed description does not limit the invention.

As will be described in detail below, server software and/or client browser software, consistent with the principles of the invention, perform certain operations that reduce perceived DNS lookup latency. Consequently, the overall "web experience" of the client may be improved.

Exemplary Network Overview

Figure 1:
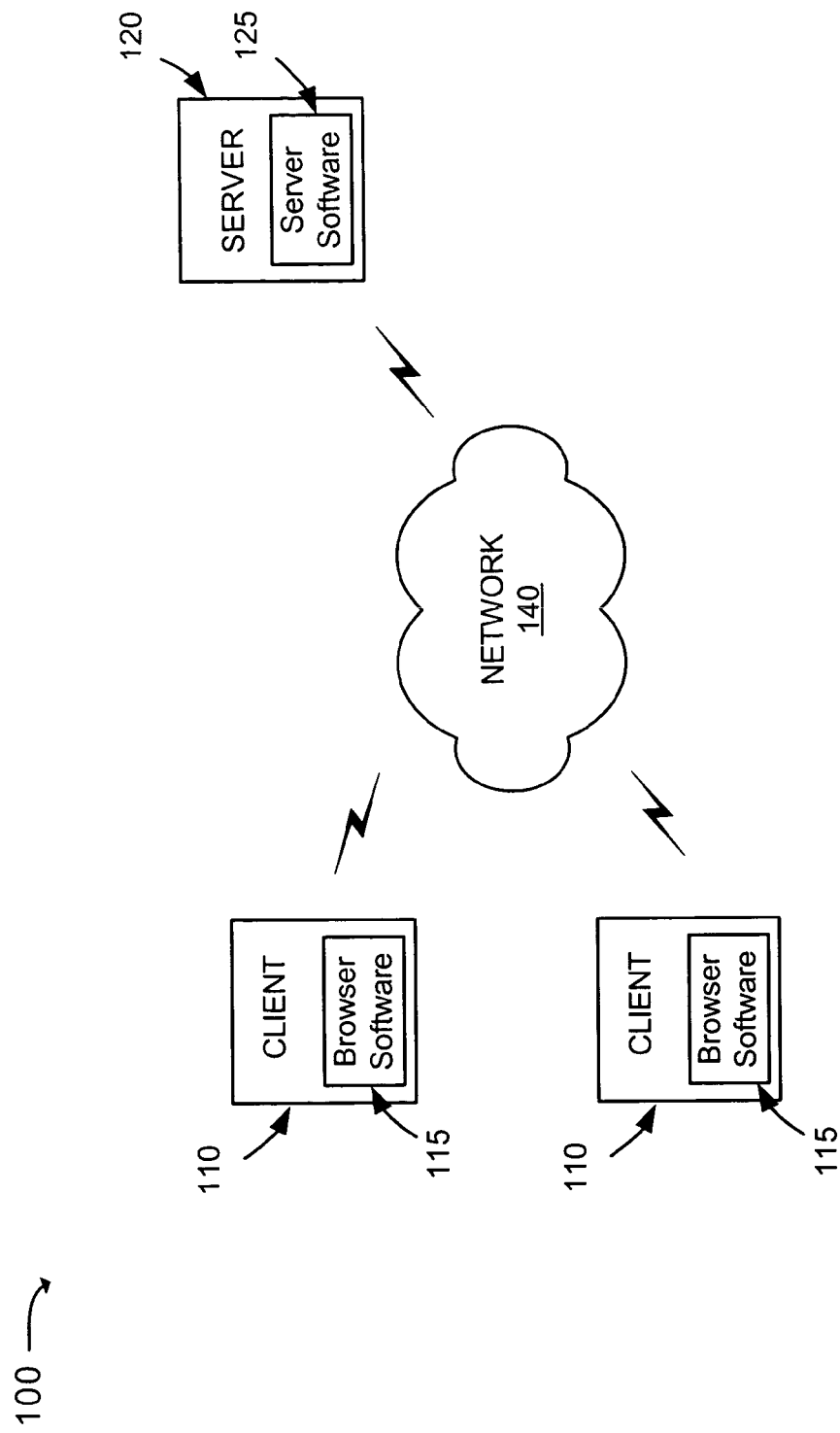
FIG. 1 is an exemplary diagram of a network in which systems and methods consistent with the principles of the invention may be implemented.

FIG. 1 is an exemplary diagram of a network 100 in which systems and methods consistent with the principles of the invention may be implemented. Network 100 may include multiple clients 110 connected to one or more servers 120 via a network 140. Network 140 may include a local area network (LAN), a wide area network (WAN), a telephone network, such as the Public Switched Telephone Network (PSTN), an intranet, the Internet, or a combination of networks. Two clients 110 and a server 120 have been illustrated as connected to network 140 for simplicity. In practice, there may be more or fewer clients and servers. Also, in some instances, a client may perform the functions of a server and a server may perform the functions of a client.

Clients 110 may include client entities. An entity may be defined as a device, such as a wireless telephone, a personal computer, a personal digital assistant (PDA), a lap top, or another type of computation or communication device, a thread or process running on one of these devices, and/or an object executable by one of these device. Server 120 may include server entities that process, search, and/or maintain documents in a manner consistent with the principles of the invention. Clients 110 and server 120 may connect to network 140 via wired, wireless, or optical connections.

Clients 110 may include client software such as browser software 115. Browser software 115 may include a web browser such as the existing Microsoft Internet Explorer or Netscape Navigator browsers. Browser software 115 may additionally include custom toolbars or other software code. Through browser software 115, users of clients 110 may navigate to various resources in network 100. For example, when network 140 is the Internet, clients 110 may navigate the web via browsers 115.

Server 120 may operate as a web server and include appropriate web server software 125. In one implementation, web server software 125 may function as a search engine, such as a query-based web page search engine. In general, in response to client requests, search engine 125 may return sets of documents to clients 110. The documents may be returned to the client as a web page containing a list of links to web pages that are relevant to the search query. This list of links may be ranked and displayed in an order based on the search engine's determination of relevance to the search query.

A document, as the term is used herein, is to be broadly interpreted to include any machine-readable and machine-storable work product. A document may be an email, a file, a combination of files, one or more files with embedded links to other files, a news group posting, etc. In the context of the Internet, a common document is a Web page. Web pages often include content and may include embedded information (such as meta information, hyperlinks, etc.) and/or embedded instructions (such as Javascript, etc.).

Exemplary Client/Server Architecture

Figure 2:
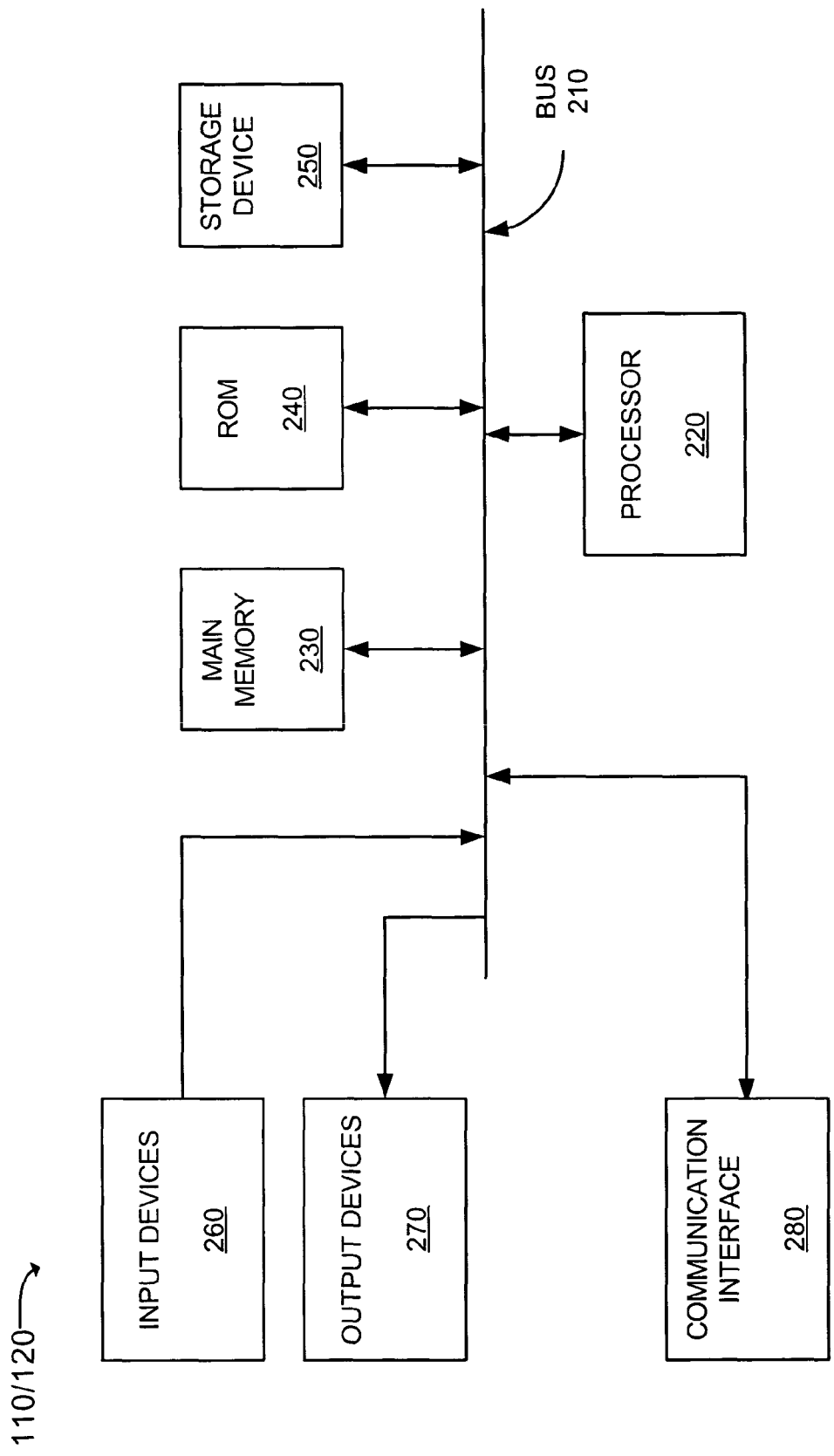
FIG. 2 is an exemplary diagram of a client or server according to an implementation consistent with the principles of the invention.

FIG. 2 is an exemplary diagram of a client 110 or server 120 according to an implementation consistent with the principles of the invention. Client/server 110/120 may include a bus 210, a processor 220, a main memory 230, a read only memory (ROM) 240, a storage device 250, one or more input devices 260, one or more output devices 270, and a communication interface 280. Bus 210 may include one or more conductors that permit communication among the components of client/server 110/120.

Processor 220 may include any type of conventional processor or microprocessor that interprets and executes instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device(s) 260 may include one or more conventional mechanisms that permit a user to input information to client/server 110/120, such as a keyboard, a mouse, a pen, voice recognition and/or biometric mechanisms, etc. Output device(s) 270 may include one or more conventional mechanisms that output information to the user, including a display, a printer, a speaker, etc. Communication interface 280 may include any transceiver-like mechanism that enables client 110 to communicate with other devices and/or systems. For example, communication interface 280 may include mechanisms for communicating with another device or system via a network, such as network 140.

The software instructions defining server software 125 and browser software 115 may be read into memory 230 from another computer-readable medium, such as data storage device 250, or from another device via communication interface 280. The software instructions contained in memory 230 causes processor 220 to perform processes that will be described later. Alternatively, hardwired circuitry may be used in place of or in combination with software instructions to implement processes consistent with the present invention. Thus, implementations consistent with the principles of the invention are not limited to any specific combination of hardware circuitry and software.

Figure 3:
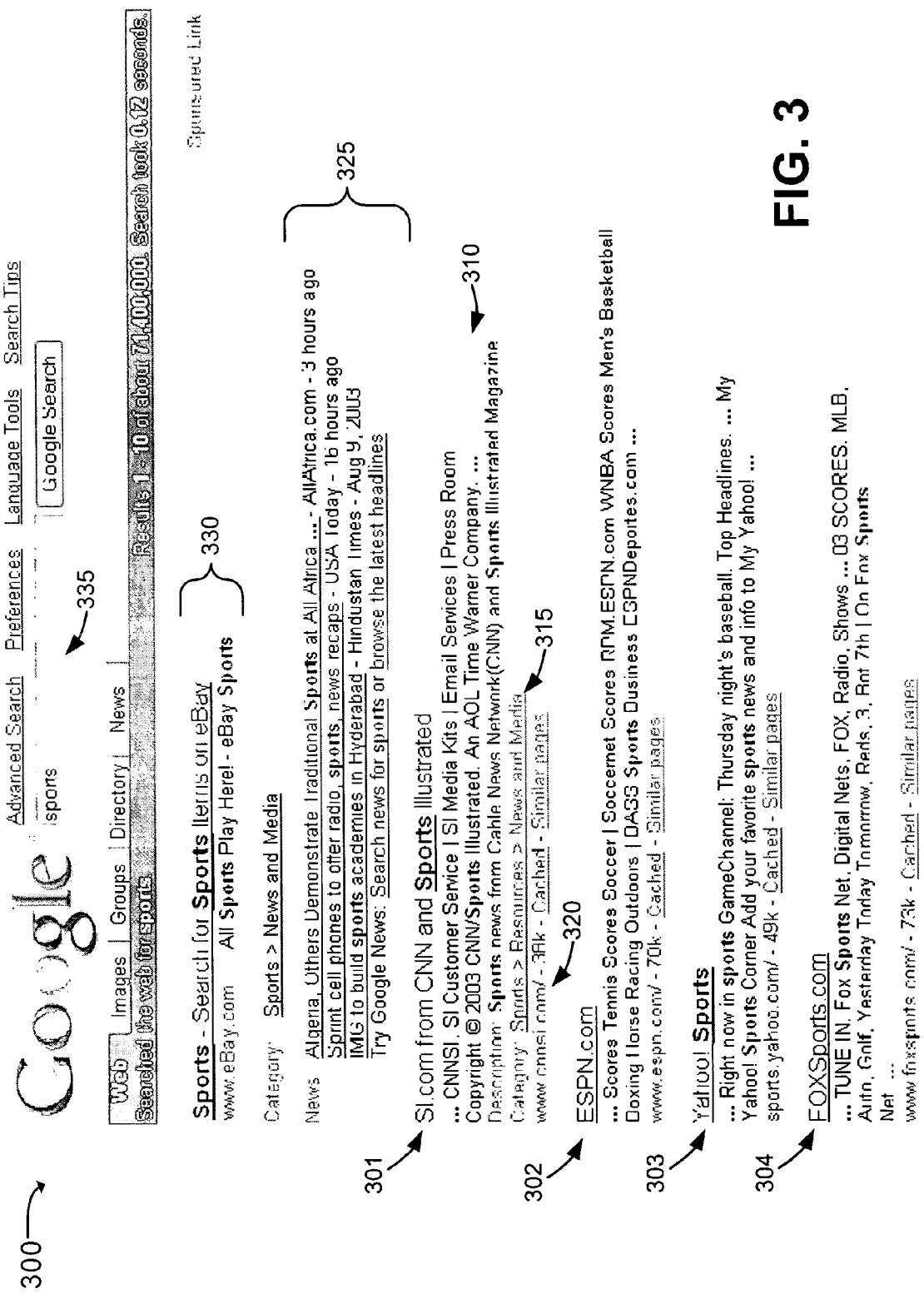
FIG. 3 is a diagram illustrating an exemplary web page that may be generated by the server shown in FIG. 1.

As mentioned, server software 125 may implement a search engine that, based on a user query, returns a list of links to documents that the server software considers to be relevant to the search. FIG. 3 is a diagram illustrating an exemplary web page 300 that may be generated by server software 125. In this example, client 110 transmitted the search query "sports" to the search engine.

Web page 300 may include a number of links 301-304 to other web pages that the search engine determines to be relevant to the search query "sports." The links may be ordered by relevance, as determined by the search engine. Thus, the first link 301 to the web page "SI.com from CNN and Sports Illustrated" was the web page determined to be most relevant to the search query. Each web page link 301-304 may additionally include annotation or summation information 310, category information 315, and a domain name 320. In addition to the links to web pages returned in response to the user search query, web page 300 may include other information such as news items 325, advertisements 330, and a search query entry dialog box 335.

Client-Side Implementation for Reduction of Perceived DNS Lookup Latency

In one implementation consistent with aspects of the invention, browser software 115 may pre-resolve DNS mappings for domain names associated with the web page currently being viewed. In this manner, when a user selects a link (e.g., link 301), the corresponding DNS lookup may have already been performed, thus saving client 110 from having to perform the DNS lookup while the user is waiting for the selected link to be rendered. Server 120 may assist browser software 115 in determining which domain names to pre-resolve.

Figure 4:
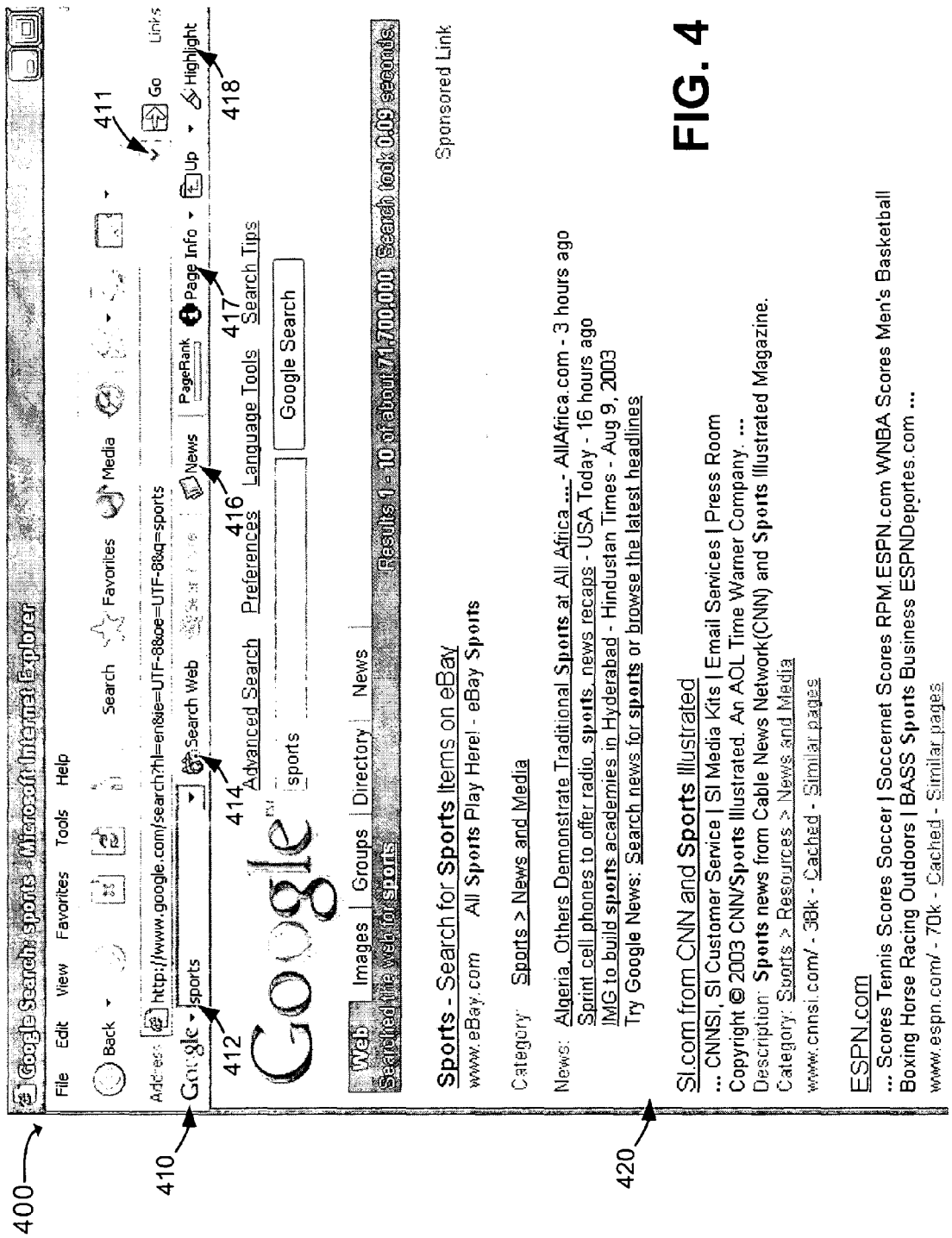
FIG. 4 is a diagram illustrating an interface of an exemplary browser implemented at the client shown in FIG. 1.

FIG. 4 is a diagram illustrating an interface of an exemplary browser 400 implemented by browsing software 115, including a toolbar 410 configured to pre-resolve DNS lookups consistent with an aspect of the invention. Toolbar 410 may be an "add-in" toolbar designed to facilitate user searches and web page navigation or may be integrated with the browser. In general, acts described herein as being implemented at client 110 can be performed by toolbar 410, the non-toolbar portion of browser 400, combinations of toolbar 410 and browser 400, or by other logic entities at client 110.

Toolbar 410 may include a search section 412 in which users may enter search queries. Users may submit the queries by pressing a graphical button such as the "search web" button 414. Button 414 may cause the search query in search section 412 to be submitted to a pre-designated search engine(s), such as a search engine implemented at server 120. Toolbar 410 may include other buttons through which the user may invoke other features of toolbar 410. For example, toolbar 410 may include a "news" button 416, a "page info" button 417, and a "highlight" button 418. These buttons may, respectively, initiate a search engine query for news articles, display additional information about the web page currently being displayed in web page display section 420, and highlight terms from the search query that are in the web page.

Browser 400 may generally function as any of a number of well known web browsers that allow users to navigate to resources at computing entities connected to the clients 110 through network 140. More specifically, in response to a user entering a request for a resource, either by directly entering a link in address bar 411 or by selecting a link in display section 420, browser 400 may resolve the domain name associated with the request (if needed), contact the resource via a HTTP (hyper-text transfer protocol) connection, and display information received from the resource. IP addresses for domain names that are recently looked-up may be stored in a DNS resolution cache. If browser 400 attempts to access a domain name recently stored in the cache, browser 400 may use the cached IP address and thus avoid having to perform another DNS lookup.

Figure 5:
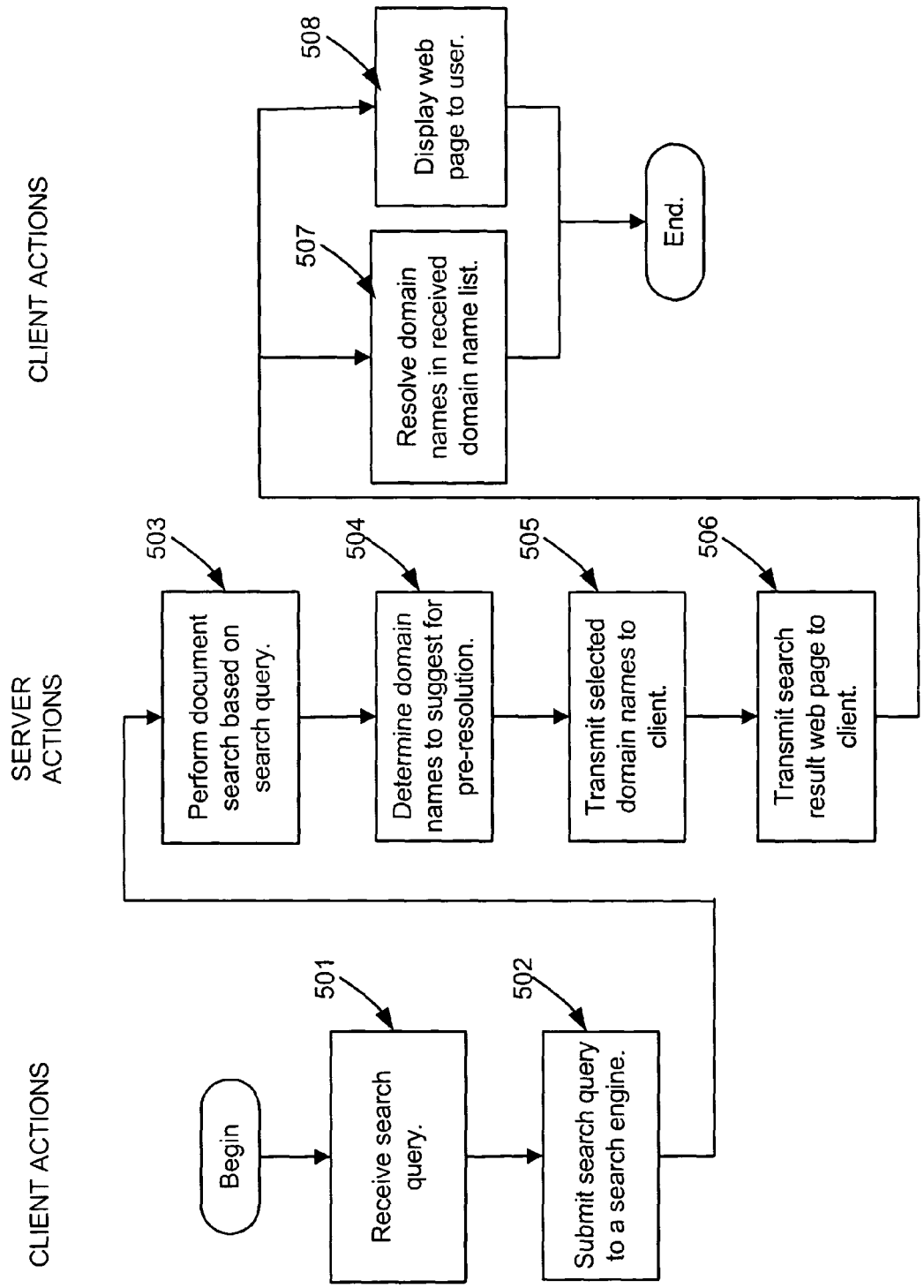
FIG. 5 is a flow chart illustrating operations consistent with aspects of the invention for pre-resolving DNS lookups.

FIG. 5 is a flow chart illustrating operations consistent with aspects of the invention for pre-resolving DNS lookups. A user may begin by entering a search query at one of clients 110 (act 501). The client 110 may then submit the search query to a search engine, such as an Internet search engine implemented in server software 125 (act 502).

Server 120 may receive the search query and perform a corresponding document search (act 503). In particular, the search engine may match the search query to a pre-indexed database of documents, such as a database constructed from documents on the web. The search engine may thus generate a set of documents relevant to the search query. The search engine may rank the documents in a particular relevance order. Ideally, the documents most relevant to the search query should have the highest ranking values. Processes for generally implementing a search engine that returns a set of ranked documents in response to a search query are known in the art and will not be described further herein.

As an example of a set of ranked documents that may be returned by server 120 in response to a search query, consider document links 301-304 (FIG. 3). In document links 301-304, the document corresponding to link 301 may have been ranked most relevant by server 120, followed by document link 302, etc.

Server 120 may determine that some or all of document links 301-304 correspond to domain names in which it would be beneficial for client 110 to pre-resolve the DNS mapping (act 504). In particular, server 120 may determine that certain document links are likely to be selected by the user. Accordingly, by pre-resolving these domain names, client 110 can decrease browsing latency when the user selects one of these links. In some implementations, a first predetermined number of the most highly ranked links, such as three document links (301-303), may be determined to be pre-resolution candidates. In some implementations, historical data (such as user selection behavior, including user click-throughs, dwell-time (i.e. the amount of time users spend at a given document), etc.) can be used to determine which links are to be pre-resolved, and a desired order for pre-resolving. In general, numerous methods may be employed to determine which links are likely to be selected by the user and therefore beneficial to be pre-resolved.

Figure 6:
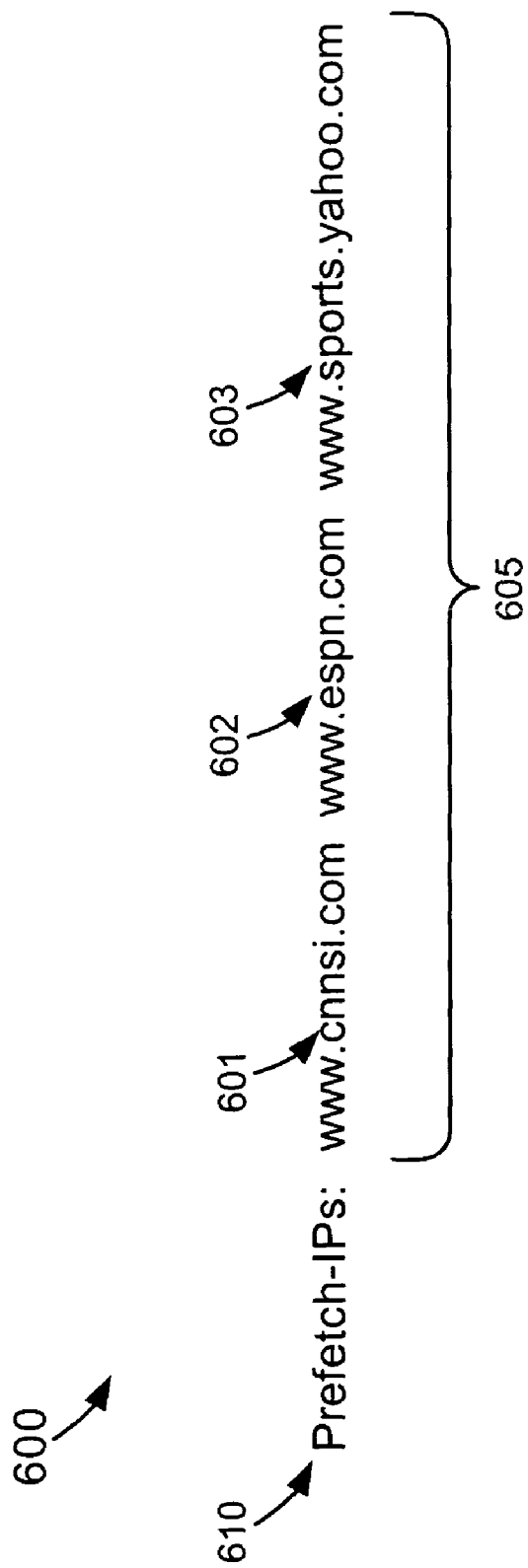
FIG. 6 is a diagram illustrating a response header that includes a series of domain names generated by the server.

Server 120 may transmit an indication of the domain names selected in act 504 to client 110 (act 505). In one implementation, the indication of the domain names selected may be in the form of a backward-compatible HTTP extension, such as an extra HTTP response header. FIG. 6 is a diagram illustrating an example of such a response header 600. As shown in FIG. 6, response header 600 may include an identification label 610 followed by a series of domain names 601-603, collectively referred to as domain name list 605. In this example, three domain names are being transmitted, although more or fewer could be transmitted. Domain names 601-603 may correspond to the domain names of the first three document references 301-303 (FIG. 3). The domain names may be separated by a space character or other delineating character(s).

Server 120 may also transmit the web page, such as web page 300, to client 110 for display of the result of the user search query (act 506). By transmitting response header 600 before web page 300, client 110 may begin DNS lookups sooner. However, in some implementations, the order in which response header 600 and web page 300 are transmitted to client 110 could be reversed or transmitted at approximately the same time.

Client 110 may receive the web page transmitted in act 506 and the domain name transmitted in act 505. Client 110 may then begin to lookup the domain names in domain name list 605 in which it does not already know the mapping to the IP address (act 507). The domain names may be looked-up in the order specified in domain name list 605. Client 110 may also display the web page to the user (act 508). Acts 507 and 508 may be performed in parallel or sequentially, and in particular, as shown in FIG. 5, may be performed asynchronously and in parallel.

As mentioned, the list of domain names 605 may be ordered so that the domain names most likely to be accessed first by the user at client 110 can be resolved first. For a search engine, the order may be based on the relevance ranking of the returned documents. For example, the four (or more) most highly ranked documents could be returned in response header 600. Not all of the hostnames referenced by document 300 need to be in response header 600. Using a subset of the hostnames referenced by document 300 may be useful to limit resource consumption by client 110. In particular, hostnames that server 120 determines to be unlikely to be selected by the user may not be returned, thus avoiding DNS lookups that are likely wasteful.

The domain name list 605 may also include domain names that are referenced in web documents referenced by web page 300. Accordingly, if a referenced web page (such as the web page referred to by link 301) includes a file that is stored at yet another host, server 120 may also include this domain name in the domain name list 605. For example, suppose that the highest ranked result of a web search is stored at the hostname "groups.google.com" and that the highest ranked result page also refers to images that are stored on "www.google.com." In this situation, server 120 may return "www.google.com" in addition to "groups.google.com" in domain name list 605, so that both domain names will likely be resolved into IP addresses in the scenario of the user selecting the link stored at hostname "groups.google.com."

As described above, domain names that are likely to be visited by a user are identified by a server. The user's client 110 may then resolve the domain names while the user is reading a current document. When the user selects a document that corresponds to a pre-resolved domain name, the document can be more quickly retrieved and rendered.

Backward-Compatible Implementation for Reduction of Perceived DNS Lookup Latency The previously discussed implementations generally use client-side logic, such as logic in tool bar 410, in addition to logic at server 120. In some situations, however, it may be desirable to not use new client-side logic, as this may require deployment/upgrades at each client 110 before that client can perform the acts described above with respect to FIG. 5.

Figure 7:
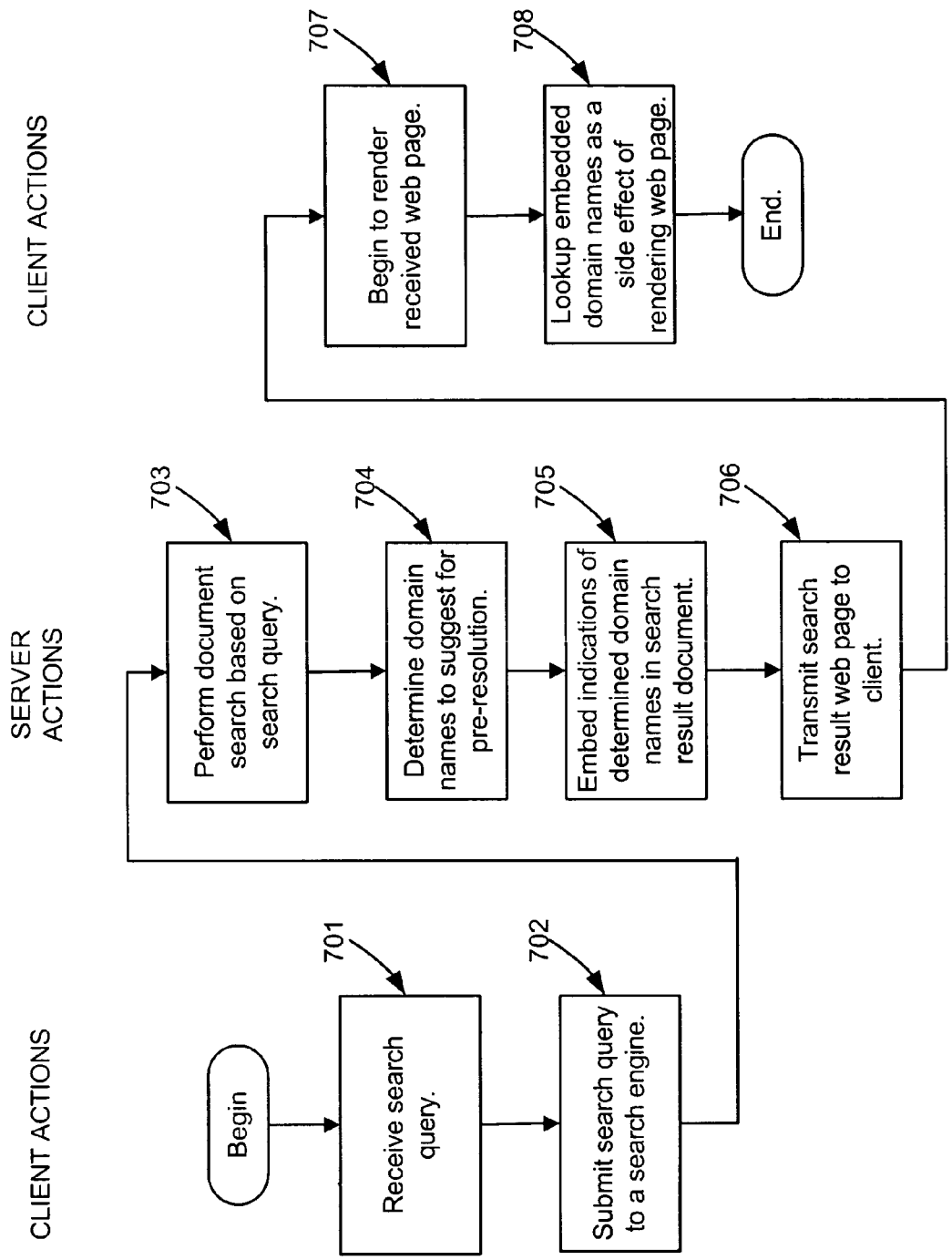
FIG. 7 is flow chart illustrating operations consistent with the present invention for reducing DNS latency using a second approach consistent with aspects of the invention.

FIG. 7 is flow chart illustrating operations consistent with the present invention for reducing perceived DNS latency using an approach that does not require modification to clients 110. As previously mentioned, existing browsers, such as Internet Explorer, Netscape Navigator, and Mozilla, may use a domain name cache that stores DNS lookup information for recently accessed domain names. Through the domain name cache, browsers reduce latency for sites at which the user is a return visitor.

Acts 701-704 of FIG. 7 are similar to acts 501-504 of FIG. 5. In particular, a user may begin by entering a search query at one of clients 110 (act 701). Client 110 may then submit the search query to a search engine, such as an Internet search engine implemented in server software 125 (act 702).

Server 120 may receive the search query and perform a corresponding document search (act 703). In particular, the search engine may match the search query to a pre-indexed database of documents, such as a database constructed from documents on the web. The search engine may thus generate a set of documents relevant to the search query. The search engine may rank the documents in a relevance order. Ideally, the documents most relevant to the search query should have the highest ranking values.

Server 120 may determine that some or all of its returned document references (e.g., document links 301-303) correspond to domain names in which it would be beneficial for client 110 to pre-resolve the DNS mapping (act 704). In particular, server 120 may determine that these document references are likely to be selected by the user. Accordingly, by pre-resolving these domain names, client 110 can decrease browsing latency when the user selects one of these references.

Server 120 may embed indications of the domain names selected in act 704 in the web page, such as web page 300, that the server assembles in response to the search query (act 705). In one implementation, these "indications" may include an invisible (1×1) image for each of the domain names selected in act 704. The invisible image is defined so that it will be requested from a host at the desired domain name. The image itself may not exist on the host. An invisible image may be defined, for example, with the HTML text: <img src="http://www.stanford.edu/nonexistentimage.gif" width=1 height=1>.

In this example, the domain name is "www.stanford.edu." The HTML code attempts to create a 1 pixel by 1 pixel image. Because the image is only a single pixel, it will not be generally noticed in web page 300 by the user. The 1×1 image, however, forces the browser to perform a DNS lookup for the domain name (e.g., www.stanford.edu), thus placing an entry in the domain name cache. Additionally, the 1×1 image can also further accelerate forthcoming requests to the web server because it may establish a keep-alive HTTP socket connection to the server. Accordingly, when the user actually selects a link corresponding to "www.stanford.edu," the IP address of the hostname will be contained in the cache and the browser will not spend time performing a DNS lookup.

Other techniques, instead of using the invisible 1×1 images may be used to indicate to the browser to load a domain name. For example, instead of using a 1×1 dummy image, server 120 may force the loading of some otherwise necessary external data (e.g., a stylesheet, an image, a favicon icon) from the desired hostnames. A script, such as a JavaScript, may also be used to force the loading of a domain name. In this manner, while pre-resolving the IP address lookups, the browser will download useful information that can be used when the user selects the corresponding link. In some implementations, server 120 may place the 1×1 dummy image (or other indication) near the end of web page 300. This may cause the browser to attempt to resolve the domain names via the dummy image after resolving other domain names that are present in web page 300; potentially resulting in the relatively non-intrusive behavior.

As mentioned in the previous paragraph, server 120 may force the loading of "favicon" icons for web pages that correspond to domain names in domain name list 605. The corresponding file, favicon.ico, is a well known file that web sites use to associate an image with the entry in the address bar/favorites section of some browsers. Using a request for the favicon icon to instruct the browser to pre-resolve a domain name may be desirable because it is small, it often exists, it is cacheable, it rarely changes, and it may be requested anyway when a bookmark to the page is made.

Returning to FIG. 7, server 120 may transmit the web page to client 110 for display of the result of the user search query (act 706). Client 110 may receive the web page transmitted in act 706, including the embedded domain names. In the normal course of rendering the web page (act 707), client 110 will lookup any domain names in which it does not already know the mapping to the IP address (act 708) and store the domain names in cache. If the user later selects a link corresponding to the domain names, the IP address will be available without requiring another DNS lookup.

By embedding certain information in a document transmitted to a client for rendering, a server can cause the client to lookup domain names corresponding to documents that the server determines the client will likely visit in the future. In this manner, when the client actually does visit the documents, the client may not have to perform a DNS lookup.

Conclusion

As described above, a user's Internet browsing experience may be enhanced by reducing perceived (DNS) lookup latency. Server 120 determines domain names that a user is likely to request in the future. These domain names may be transmitted to the browser as a separate command or as information embedded in a web page. In either case the browser, or an add-in toolbar associated with the browser, can lookup the domain names in the background and may be immediately available when links corresponding to the domain names are selected by the user.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the present invention is not limiting of the present invention. Thus, the operation and behavior of the aspects were described without reference to the specific software code—it being understood that a person of ordinary skill in the art would be able to design software and control hardware to implement the aspects based on the description herein.

The foregoing description of implementations consistent with the present invention provides illustration and description, but is not intended to be exhaustive or to limit the invention to the precise form disclosed. Modifications and variations are possible in light of the above teachings or may be acquired from practice of the invention.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A method, performed by one or more server devices, for improving latency of a browser program on a client device that is separate from the one or more server devices, the method comprising:
   receiving, by one or more processors of the one or more server devices, a document requested by the browser program on the client device;
   analyzing, by one or more processors of the one or more server devices, the document to generate a list of domain names associated with a plurality of links, within the document, that are selectable via the browser program, the analyzing including:
   determining, based on historical data, for which links, of the plurality of links within the document, to include associated domain names in the list of names,
   the historical data being based on at least one of:
   a quantity of times that a particular link, of the plurality of links, has been accessed, or an amount of time spent by users accessing documents linked to by the plurality of links, the list of domain names being ordered based on a relevance of documents, associated with the domain names, to the document;
   transmitting, from the one or more server devices, the list to the client device, the list permitting the client device to perform domain name system (DNS) lookups for the domain names in the list prior to receiving a selection, at the client device, of any of the plurality of links within the document;
   transmitting, from the one or more server devices, the document to the client device; and
   performing, by the client device and in an order indicated by the list, one or more DNS lookups for one or more of the domain names in the list without receiving a selection of any of the plurality of links within the document.

2. The method of claim 1, where receiving the document requested by the client device includes:
   receiving a search query; and
   generating the document as a web page that includes a plurality of references to documents that are related to the search query.

3. The method of claim 1, where transmitting the list of domain names includes:
   transmitting the list of domain names in a hyper-text transfer protocol (HTTP) response header.

4. The method of claim 1, where transmitting the list of domain names includes:
   transmitting the list of domain names to the client device before transmitting the document to the client device.

5. The method of claim 1, where transmitting the list of domain names includes:
   transmitting the list of domain names to the client device as part of the document.

6. The method of claim 1, where the list of domain names additionally includes domain names selected from domains referenced by documents corresponding to links within the document.

7. A non-transitory computer-readable medium, comprising:
   a plurality of computer-executable instructions, which, when executed by one or more processors, cause the one or more processors to:
   receive a document requested by a browser program on a client device;
   analyze the document to generate a list of domain names associated with a plurality of links, within the document, that are selectable via the browser program, the instructions, which cause the one or more processors to analyze the document further causing the one or more processors to:
   determine, based on historical data, for which links, of the plurality of links within the document, to include associated domain names in the list of names, the historical data being based on at least one of:
   a quantity of times that a particular link, of the plurality of links, has been accessed, or an amount of time spent by users accessing documents linked to by the plurality of links the list of domain names being ordered based on a relevance of documents, associated with the domain names, to the document;
   transmit the list to the client device, the list permitting the client device to perform domain name system (DNS) lookups for the domain names in the list prior to receiving a selection, at the client device, of any of the plurality of links within the document;
   transmit the document to the client device; and
   perform, in an order indicated by the list, one or more DNS lookups for one or more of the domain names in the list without receiving a selection of any of the plurality of links within the document.

8. The computer-readable medium of claim 7, where the plurality of computer-executable instructions, which cause the one or more processors to receive the document requested by the client device, further cause the one or more processors to:
   receive a search query; and
   generate the document as a web page that includes a plurality of references to documents that are related to the search query.

9. The computer-readable medium of claim 7, where the plurality of computer-executable instructions, which cause the one or more processors to transmit the list of domain names, further cause the one or more processors to:
   transmit the list of domain names in a hyper-text transfer protocol (HTTP) response header.

10. The computer-readable medium of claim 7, where the plurality of computer-executable instructions, which cause the one or more processors to transmit the list of domain names, further causes the one or more processors to:
    transmit the list of domain names to the client device before transmitting the document to the client device.

11. The computer-readable medium of claim 7, where the plurality of computer-executable instructions, which cause the one or more processors to transmit the list of domain names, further causes the one or more processors to:
transmit the list of domain names to the client device as part of the document.

12. The computer-readable medium of claim 7, where the list of domain names additionally includes domain names selected from domains referenced by documents corresponding to links within the document.

13. A system, comprising:
one or more devices to:
receive a document requested by a browser program on a client device;
analyze the document to generate a list of domain names associated with a plurality of links, within the document, that are selectable via the browser program, the instructions, which cause the one or more processors to analyze the document further causing the one or more processors to:
determine, based on historical data, for which links, of the plurality of links within the document, to include associated domain names in the list of names, the historical data being based on at least one of:
a quantity of times that a particular link, of the plurality of links, has been accessed, or an amount of time spent by users accessing documents linked to by the plurality of links, the list of domain names being ordered based on a relevance of documents, associated with the domain names, to the document;
transmit the list to the client device, the list permitting the client device to perform domain name system (DNS) lookups for the domain names in the list prior to receiving a selection, at the client device, of any of the plurality of links within the document;
transmit the document to the client device; and
perform, in an order indicated by the list, one or more DNS lookups for one or more of the domain names in the list without receiving a selection of any of the plurality of links within the document.

14. The system of claim 13, where when receiving the document requested by the client device, the one or more devices are to:
receive a search query; and
generate the document as a web page that includes a plurality of references to documents that are related to the search query.

15. The system of claim 13, where when transmitting the list of domain names, the one or more devices are to:
transmit the list of domain names in a hyper-text transfer protocol (HTTP) response header.

16. The system of claim 13, where when transmitting the list of domain names, the one or more devices are to:
transmit the list of domain names to the client device before transmitting the document to the client device.

17. The system of claim 13, where when transmitting the list of domain names, the one or more devices are to:
transmit the list of domain names to the client device as part of the document.

18. The system of claim 13, where the list of domain names additionally includes domain names selected from domains referenced by documents corresponding to links within the document.

* * * * *